United States Patent
Osafune et al.

(10) Patent No.: US 10,227,811 B2
(45) Date of Patent: Mar. 12, 2019

(54) EXTENSIBLE/CONTRACTIBLE DRIVING DEVICE AND OPENABLE BODY OPENING/CLOSING DEVICE

(71) Applicant: HI-LEX CORPORATION, Takarazuka-shi (JP)

(72) Inventors: Hitoshi Osafune, Takarazuka (JP); Hiroyuki Inagaki, Takarazuka (JP)

(73) Assignee: HI-LEX CORPORATION, Takarazuka-shi (JP)

( * ) Notice: Subject to any disclaimer, the term of this patent is extended or adjusted under 35 U.S.C. 154(b) by 49 days.

(21) Appl. No.: 15/529,654

(22) PCT Filed: Dec. 1, 2015

(86) PCT No.: PCT/JP2015/083677
§ 371 (c)(1),
(2) Date: May 25, 2017

(87) PCT Pub. No.: WO2016/088730
PCT Pub. Date: Jun. 9, 2016

(65) Prior Publication Data
US 2017/0328114 A1    Nov. 16, 2017

(30) Foreign Application Priority Data

Dec. 2, 2014 (JP) ................................. 2014-243885

(51) Int. Cl.
*E05F 15/622* (2015.01)
*F16H 25/20* (2006.01)
(Continued)

(52) U.S. Cl.
CPC ............ *E05F 15/622* (2015.01); *E05F 15/63* (2015.01); *F16H 25/20* (2013.01); *F16H 35/18* (2013.01);
(Continued)

(58) Field of Classification Search
CPC .. E05F 15/63; E05F 1/1058; E05Y 2900/546; F16H 2025/2075; F16H 35/18; F16H 25/20
See application file for complete search history.

(56) References Cited

U.S. PATENT DOCUMENTS 6,516,567 B1 *  2/2003  Stone .................... E05F 15/622
                                                                  296/55
7,681,469 B2 *  3/2010  Ritter ...................... F16H 25/20
                                                                  74/89.23
(Continued)

FOREIGN PATENT DOCUMENTS

EP         2549145 A1     1/2013
JP      H03-272354 A     12/1991
(Continued)

OTHER PUBLICATIONS

International Search Report for International Application No. PCT/JP2015/083677 dated Feb. 23, 2016.

*Primary Examiner* — Justin B Rephann
(74) *Attorney, Agent, or Firm* — Kratz, Quintos & Hanson, LLP

(57) ABSTRACT

This extensible/contractible driving device includes a rotatable driving member configured to be rotated by drive force of a driving unit; a drive force-transmitting member connected to a leading end of the internal cylinder, configured to be driven by the rotatable driving member so as to move along a rotary shaft direction of the rotatable driving member; and an elastic member disposed in the periphery of the drive force-transmitting member, connected to the leading end of the internal cylinder, and configured to apply biasing force in the rotary shaft direction to the drive force-transmitting member. The rotatable driving member, the drive force-transmitting member, and the elastic member include an intervening member (24) stored in an inner space
(Continued)

between external and internal cylinders, disposed in the periphery of the internal cylinder, and intervening between the internal cylinder and the external cylinder. The intervening member (24) includes a plurality of component parts (31a, 31b) having a length in a longitudinal direction of the external cylinder. One of the component parts (31a) is displaced relatively with respect to the other component part (31b) so that the intervening member (24) is opened widely outward. Accordingly, it is possible to suppress a problem of slidability caused by distortion in shape of the intervening member (24) and a problem of interference among the composing members.

5 Claims, 6 Drawing Sheets

(51) Int. Cl.
    *B60J 5/10*         (2006.01)
    *E05F 15/63*       (2015.01)
    *F16H 35/18*       (2006.01)

(52) U.S. Cl.
    CPC .......... *B60J 5/101* (2013.01); *E05Y 2900/546* (2013.01); *F16H 2025/204* (2013.01); *F16H 2025/2031* (2013.01); *F16H 2025/2075* (2013.01)

(56) References Cited

U.S. PATENT DOCUMENTS

| | | | | |
|---|---|---|---|---|
| 7,938,473 | B2* | 5/2011 | Paton | B60J 5/101 296/146.8 |
| 8,006,817 | B2* | 8/2011 | Hanna | E05F 15/622 188/300 |
| 9,097,056 | B2* | 8/2015 | Kummer | E05F 15/622 |
| 2007/0062119 | A1* | 3/2007 | Ritter | F16H 25/20 49/343 |
| 2007/0261306 | A1* | 11/2007 | Hanna | E05F 15/622 49/52 |
| 2008/0060273 | A1* | 3/2008 | Bochen | H02K 7/06 49/340 |
| 2008/0216409 | A1* | 9/2008 | Bochen | E05F 15/622 49/340 |
| 2008/0271552 | A1* | 11/2008 | Arenz | F16H 25/20 74/89.23 |
| 2009/0044645 | A1* | 2/2009 | Buescher | F16H 25/20 74/89 |
| 2010/0162839 | A1* | 7/2010 | Reif | F16D 7/021 74/89.38 |
| 2011/0290050 | A1* | 12/2011 | Kummer | E05F 15/622 74/89.37 |
| 2013/0019420 | A1 | 1/2013 | Gronli | |
| 2014/0000394 | A1* | 1/2014 | Anheier | F16H 25/20 74/89.29 |
| 2016/0153532 | A1* | 6/2016 | Fischer | F16H 25/20 74/89.35 |
| 2016/0312514 | A1* | 10/2016 | Leonard | E05F 15/622 |
| 2017/0044814 | A1* | 2/2017 | Scheuring | E05F 15/622 |
| 2017/0081895 | A1* | 3/2017 | Osafune | B60J 5/10 |
| 2017/0089113 | A1* | 3/2017 | Katsuyama | E05F 15/00 |
| 2017/0145727 | A1* | 5/2017 | Yamagata | F16H 25/2454 |
| 2017/0275939 | A1* | 9/2017 | Tsukagoshi | F16H 25/20 |

FOREIGN PATENT DOCUMENTS

| | | |
|---|---|---|
| JP | H06-15706 A | 1/1994 |
| JP | 2002-337680 A1 | 11/2002 |
| JP | 2003-184982 A1 | 7/2003 |
| JP | 4755362 B2 | 8/2011 |
| JP | 2014-101637 A1 | 6/2014 |

* cited by examiner

EXTENSIBLE/CONTRACTIBLE DRIVING DEVICE AND OPENABLE BODY OPENING/CLOSING DEVICE

TECHNICAL FIELD

The present invention relates to an extensible/contractible driving device and an openable body opening/closing device.

BACKGROUND ART

As is known in the art, there is an openable body opening/closing device configured to open/close a back door of an automobile, using an extensible/contractible driving device which extends/contracts when driven by a driving unit.

Patent Literature 1 discloses a structure with an extensible/contractible driving device such as the device mentioned above configured to open a door of a refrigerator by electrical drive.

In regard to a technique relative to the present invention, Patent Literature 2 discloses a structure with a mold injection machine configured to move a screw in an axial direction by rotating the screw inside a screw cylinder so as to communicate or shut off a plasticizing part and an injection chamber.

In regard to another technique relative to the present invention, Patent Literature 3 discloses a structure with a master cylinder including a cylinder body and a piston, wherein the cylinder body includes a spring configured to apply spring force to the piston.

CITATION LIST

Patent Literature

Patent Literature 1: JP 4755362 B2
Patent Literature 2: JP 6-15706 A
Patent Literature 3: JP 2002-337680 A

SUMMARY OF INVENTION

Technical Problem

An extensible/contractible driving device includes an external cylinder; and an internal cylinder stored inside the external cylinder. The extensible/contractible driving device is configured to extend/contract by relatively displacing the external and internal cylinders in an axial direction of the cylinders. In a case where the external and internal cylinders are metallic, rubbing sound such as metal sound may be generated when these cylinders are brought into contact with each other during relative displacement.

To smooth the relative movement between the external cylinder and internal cylinder and to suppress rubbing sound generated between the external cylinder and internal cylinder, an intervening member such as a sleeve may be provided between the external and internal cylinders. The sleeve may be formed of a material having slidability with respect to a member to be brought into contact with the sleeve and may be configured to cover most part of an inner surface of the external cylinder.

However, the sleeve having a size and shape large enough to cover most part of the inner surface of the external cylinder has a tubular shape or a shape in which a partial range of its tubular body is cut out. Therefore, it is difficult to shape the sleeve by die forming so that the sleeve is produced by extrusion molding. A member with a relatively long length in an axial direction is difficult to form evenly by the extrusion molding. In a case of employing the extrusion molding, the shape of the sleeve may be distorted. The distortion may cause contact between the sleeve and the external cylinder and/or internal cylinder, which deteriorates the slidability of the sleeve with the external cylinder or internal cylinder. Furthermore, in a case where the shape of the sleeve is distorted, when the sleeve is inserted inside the external cylinder and the internal cylinder is inserted inside the sleeve during assembly of the extensible/contractible driving device, there may be a problem that interference among composing members deteriorates workability.

An object of the present invention is to suppress a problem of slidability caused by distortion in shape of an intervening member such as a sleeve and a problem of interference among composing members in regard to an extensible/contractible driving device including the intervening member such as the sleeve between external and internal cylinders, and in regard to an openable body opening/closing device including such an extensible/contractible driving device.

Solution to Problem

An extensible/contractible driving device according to an aspect of the present invention includes: an external cylinder provided with a driving unit inside the external cylinder; an internal cylinder provided inside the external cylinder, having a closing structure at a leading end of the internal cylinder, and relatively moved in an axial direction with respect to the external cylinder; a rotatable driving member configured to be rotated by drive force of the driving unit; a drive force-transmitting member connected to the leading end of the internal cylinder, and configured to be driven by the rotatable driving member so as to move along a rotary shaft direction of the rotatable driving member; and an elastic member disposed in the periphery of the drive force-transmitting member, connected to the leading end of the internal cylinder, and configured to apply biasing force in the rotary shaft direction to the drive force-transmitting member, wherein the rotatable driving member, the drive force-transmitting member, and the elastic member include an intervening member stored in an inner space between the external cylinder and the internal cylinder, disposed in the periphery of the internal cylinder, and intervening between the internal cylinder and the external cylinder, wherein the intervening member includes a plurality of component parts having a length in a longitudinal direction of the external cylinder, and wherein one of the component parts is displaced relatively with respect to the other component part so that the intervening member is opened widely outward.

An openable body opening/closing device according to an aspect of the present invention includes: the extensible/contractible driving device; and an openable body connected to the extensible/contractible driving device, wherein the extensible/contractible driving device is driven to open/close the openable body.

Advantageous Effects of Invention

According to an embodiment of the present invention, it is possible to suppress a problem of slidability caused by distortion in shape of an intervening member such as a sleeve and a problem of interference among composing members.

BRIEF DESCRIPTION OF DRAWINGS

FIG. 2(a) is a longitudinal sectional view of the entire extensible/contractible driving device, and FIG. 2(b) is a longitudinal sectional view in which part of the extensible/contractible driving device is enlarged.

DESCRIPTION OF EMBODIMENTS

An embodiment of the present invention will now be described in detail with reference to the accompanying drawings.

Embodiments

Figure 1:
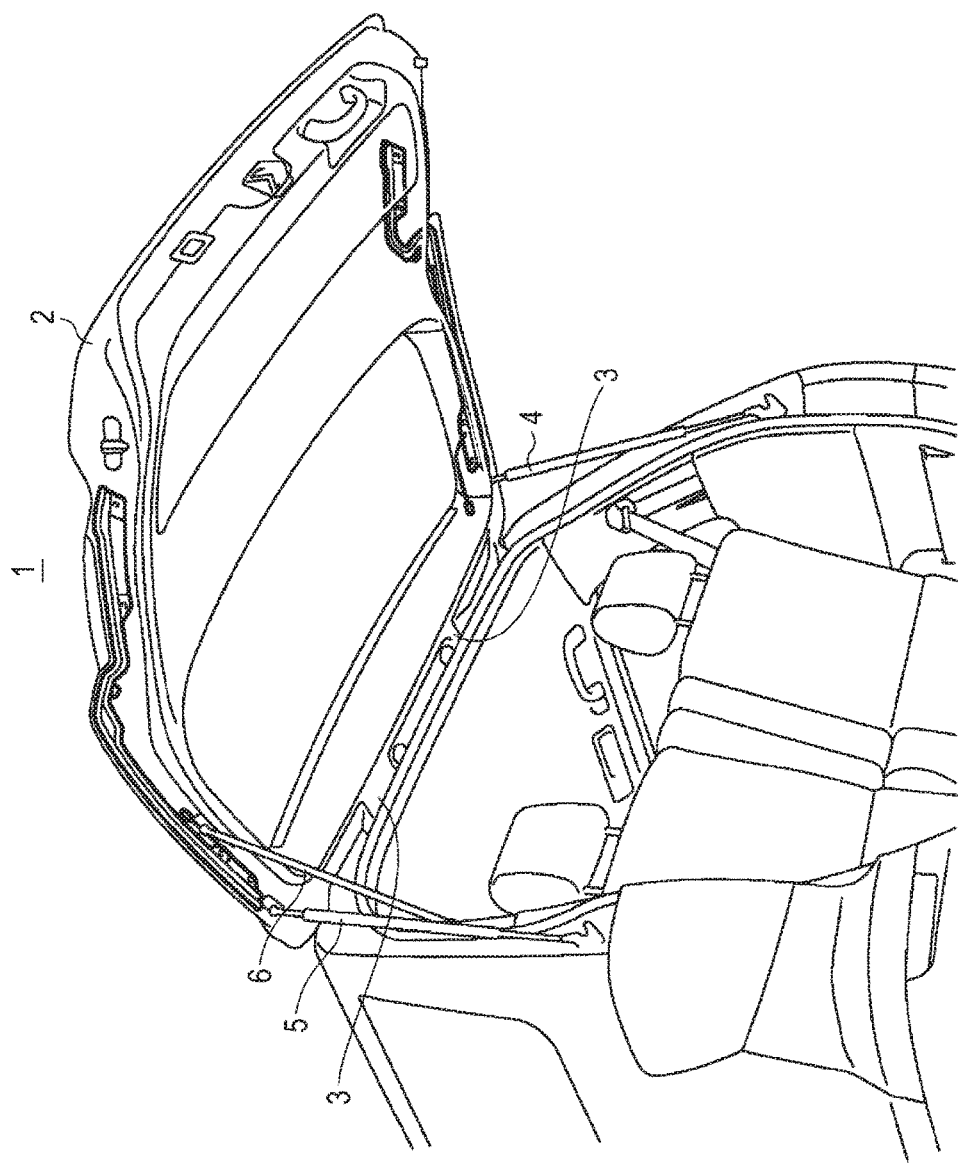
FIG. 1 is an external view illustrating a configuration of an openable body opening/closing device according to an embodiment of the present invention.

FIG. 1 is an external view illustrating a configuration of an openable body opening/closing device 1 according to an embodiment of the present invention.

The openable body opening/closing device 1 includes a back door 2; a first stay 4; a second stay 5; and an extensible/contractible driving device 6.

The back door 2 (corresponding to an example of an openable body) is configured to open/close an opening part disposed in a rear part of a vehicle cabin. The back door 2 is disposed in the opening part of the rear part of the vehicle cabin. The back door 2 is rotatably connected to a hinge 3 provided to a vehicle and is configured to open/close the opening part, rotating around the hinge 3. The back door 2 is connected to the rear part of the vehicle through the first stay 4, second stay 5, and extensible/contractible driving device 6.

When closing the back door 2, the first and second stays 4, 5 contract in accordance with the movement of the back door 2. When opening the back door 2, the first and second stays 4, 5 extend in accordance with the movement of the back door 2. In other words, the first and second stays 4, 5 are members configured to support the opening/closing operation of the back door 2.

The extensible/contractible driving device 6 is driven to extend/contract so as to open/close the back door 2. The extensible/contractible driving device 6 is a stick-like component having a length in an extending/contracting direction. When the extensible/contractible driving device 6 is driven to contract, the back door 2 is closed. When the extensible/contractible driving device 6 is driven to extend, the back door 2 is opened. One end of the extensible/contractible driving device 6 is connected to the rear part of the vehicle, and the other end thereof is connected to the back door 2. One or the other end of the extensible/contractible driving device 6 may be connected to the rear part of the vehicle or to the back door 2 through coupling components. The extensible/contractible driving device 6 will now be described with reference to FIGS. 2(a), 2(b), and 3.

Figure 2:
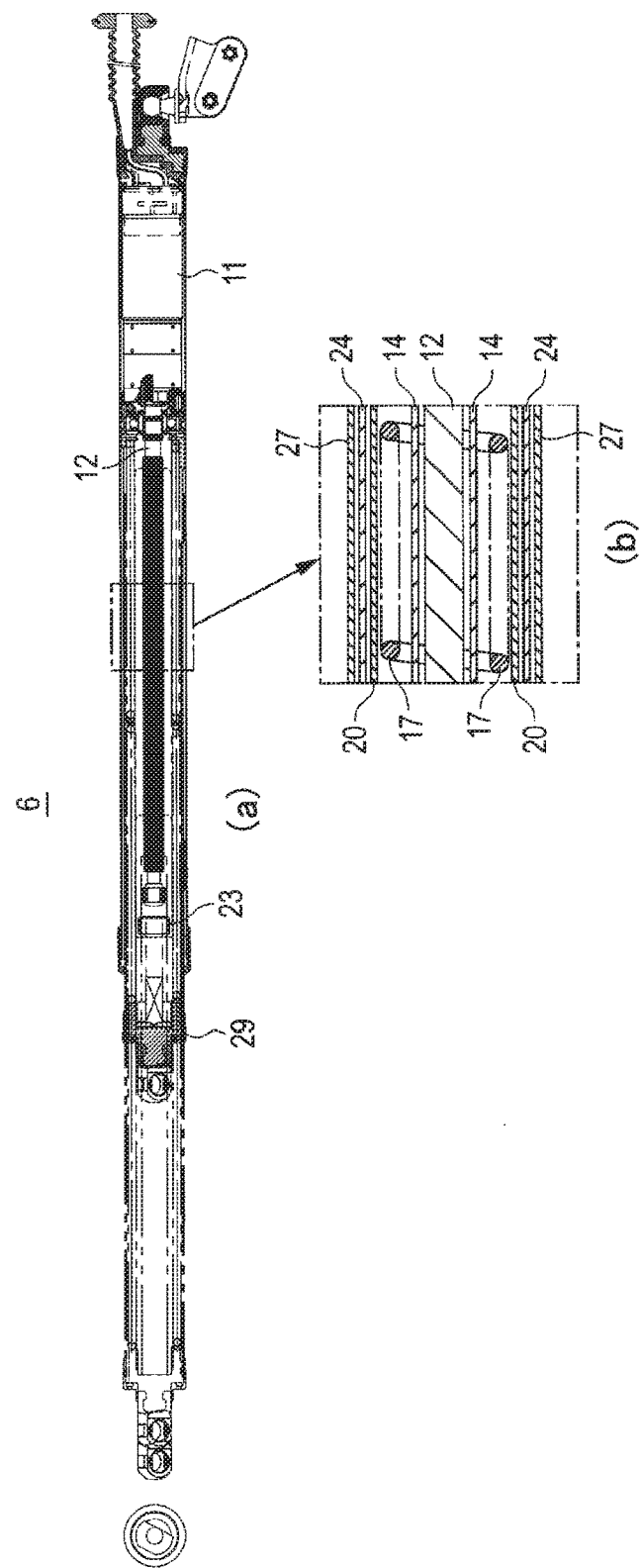
FIGS. 2(a), 2(b) are longitudinal sectional views in which an extensible/contractible driving device illustrated in FIG. 1 is cut in an axial direction.
Figure 3:
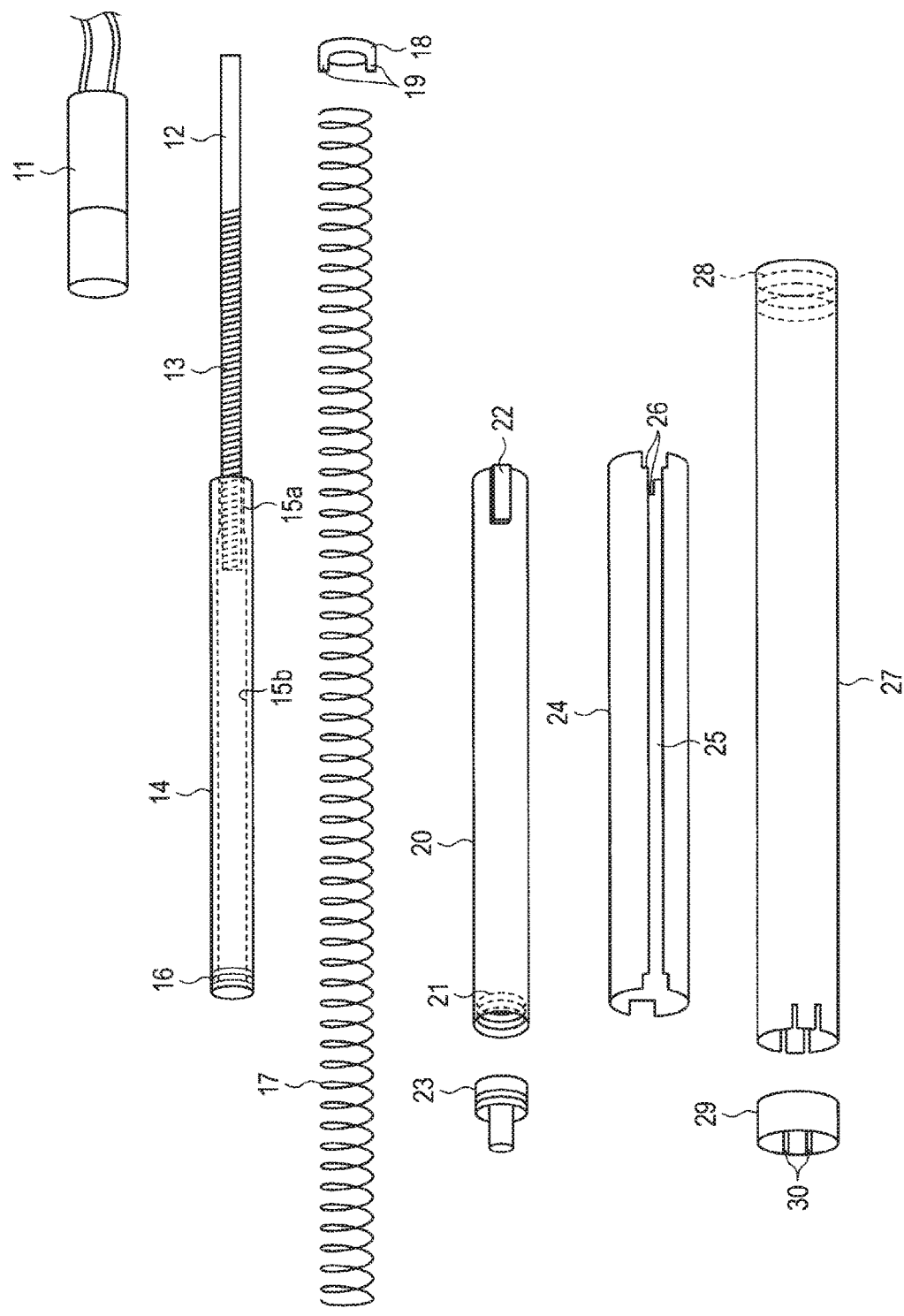
FIG. 3 is an exploded view illustrating disassembly of each component of the extensible/contractible driving device illustrated in FIG. 1.

FIGS. 2(a), 2(b) are longitudinal sectional views in which the extensible/contractible driving device 6 illustrated in FIG. 1 is cut in an axial direction. FIG. 2(a) is a longitudinal sectional view of the entire extensible/contractible driving device 6, and FIG. 2(b) is a longitudinal sectional view in which part of the extensible/contractible driving device 6 is enlarged. FIG. 3 is an exploded view illustrating disassembly of each component of the extensible/contractible driving device 6 illustrated in FIG. 1. Herein, the extending/contracting direction of the extensible/contractible driving device 6 will be referred to as the axial direction.

As illustrated in FIG. 3, the extensible/contractible driving device 6 includes a motor 11, a screw member 12, a nut member 14, a spring 17, a spring base 18, an internal cylinder 20, an internal cylinder cap 23, a sleeve 24, and an external cylinder 27. As illustrated in FIGS. 2(a) and 2(b), the sleeve 24 is disposed in the inner periphery side of the external cylinder 27, and the internal cylinder 20 is disposed in the inner periphery side of the sleeve 24. The spring 17 is disposed in the inner periphery side of the internal cylinder 20, and the nut member 14 is disposed in the inner periphery side of the spring 17. The screw member 12 is disposed in the inner periphery side of the nut member 14.

The external cylinder 27 is a hollow member with both ends opened, having a tubular shape (for example, cylindrical shape) extending in the axial direction. A hollow portion of the external cylinder 27 is provided with the motor 11, screw member 12, nut member 14, spring 17, internal cylinder 20, sleeve 24, and the like. The external cylinder 27 has a length in the axial direction substantially approximating a sum of a length in the axial direction of a driving unit including the motor 11 and a length in the axial direction of the internal cylinder 20. One end side of the external cylinder 27 in the axial direction contains the motor 11, and the other end side contains the screw member 12, nut member 14, spring 17, internal cylinder 20, and sleeve 24.

One end side of the external cylinder 27 in the axial direction is provided with a motor-fixing part 28. Specifically, the motor-fixing part 28 is a female thread provided to an end inside the external cylinder 27. The other end side of the external cylinder 27 in the axial direction is fitted with an external cylinder cap 29.

The internal cylinder 20 is a hollow member with both ends opened, having a tubular shape (for example, cylindrical shape) extending in the axial direction. As the internal cylinder 20 is inserted into the hollow portion of the external cylinder 27 and is relatively moved with respect to the external cylinder 27 in the axial direction, the extensible/contractible driving device 6 extends/contracts. An inner space of the external cylinder 27 and internal cylinder 20 contains the screw member 12, nut member 14, and spring 17.

The internal cylinder 20 is provided with a second fixing part 21 and guided part 22. The second fixing part 21 is a part in which the internal cylinder cap 23 is to be fixed and which is provided to one end in the axial direction of the internal cylinder 20 (an end in a side where the internal cylinder 20 is to be taken out from the external cylinder 27). Specifically, the second fixing part 21 is a female thread provided to the inner periphery of the internal cylinder 20. The guided part 22 is provided to the other end in the axial direction (an end in a side which is to remain in the hollow portion of the external cylinder 27). The guided part 22 is a protrusion protruded outward in a radial direction of the internal cylinder 20, provided to a part of the internal cylinder 20 in a peripheral direction. Note that specific structures of the guided part 22 such as a position, length, and the like can be appropriately designed as long as the guided part 22 is provided to a position corresponding to a guiding part 25 of the sleeve 24 (to be mentioned) and is configured to be guided by the guiding part 25.

The sleeve 24 (corresponding to an example of an intervening member) is a member intervening between the internal cylinder 20 and external cylinder 27 for smoothing the relative movement between the internal cylinder 20 and external cylinder 27. The sleeve 24 is formed of a synthetic resin such as polybutylene terephthalate (PBT), and fluororesin, having slidability with respect to a member to be brought into contact with the sleeve 24. The sleeve 24 is fixedly disposed along the inner periphery of the external cylinder 27. In the inner periphery side of the sleeve 24, the internal cylinder 20 is disposed slidably with respect to the sleeve 24. The sleeve 24 prevents direct contact between the internal cylinder 20 and external cylinder 27. Furthermore, when most of the internal cylinder 20 moves outside the external cylinder 27, the sleeve 24 intervenes between the external cylinder 27 and spring 17 so as to prevent direct contact therebetween.

Structures of the sleeve 24 will be described later in more detail, but here is a brief description. When incorporated in the extensible/contractible driving device 6, the sleeve 24 is shaped in such a manner that a predetermined range of the tubular body is cut out, having a gap and the like. FIG. 3 illustrates a state where the sleeve 24 is incorporated in the extensible/contractible driving device 6. A part of the sleeve 24 in the peripheral direction has a gap in the axial direction extending from one end to the other end. This gap extending in the axial direction constitutes the guiding part 25 configured to guide the guided part 22 of the internal cylinder 20. The internal cylinder 20 moves in the axial direction while the guided part 22 of the internal cylinder 20 moves along the guiding part 25 of the sleeve 24 so that the internal cylinder 20 is prevented from rotating with respect to the sleeve 24 in the peripheral direction.

When supplied with power, the motor 11 (corresponding to an example of the driving unit) outputs drive force. The motor 11 includes an output shaft configured to be driven to rotate. The motor 11 is capable of driving the output shaft to rotate positively and negatively. The motor 11 is fixed in the motor-fixing part 28 of the external cylinder 27 and fixed in one end of the external cylinder 27. The motor 11 is fixed in such a manner that the motor 11 may not move in the axial direction with respect to the external cylinder 27 and may not rotate in the peripheral direction. Specifically, the motor 11 is fixed by screwing a male thread provided to the periphery of the motor 11 into the female thread of the motor-fixing part 28. The motor 11 is disposed in such a manner that a leading end of the output shaft faces a side where the internal cylinder 20 is to be disposed. Note that the motor 11 may be fixed in the external cylinder 27 by being sandwiched between a lid member configured to lid an end of the external cylinder and a stopping member fastened and fixed inside the external cylinder.

The screw member 12 (corresponding to an example of a rotatable driving member) and the nut member 14 (a drive force-transmitting member) are combined with each other so as to perform as a power conversion mechanism configured to convert drive force in a rotating direction transmitted from the motor 11 into drive force in the axial direction.

The screw member 12 is a straight shaft member, including a screw portion 13 in which male threads having the same diameter are continuously formed in a spiral manner in the axial direction. The screw portion 13 has a length in the axial direction equivalent to or more than an amount of displacement of the extensible/contractible driving device 6. The screw member 12 is disposed on a straight line with the output shaft of the motor 11, and one end thereof is connected to the output shaft of the motor 11. The output shaft of the motor 11 applies rotative force to the screw member 12 so that the screw member 12 rotates around a central axis. The screw portion 13 is configured to screw with a thread portion 15*a* of the nut member 14.

The nut member 14 is a hollow member, having a shaft-like shape, including the thread portion 15*a* and a hollow portion 15*b* in the inner periphery side. The thread portion 15*a* is a female thread configured to be screwed with the screw portion 13, provided in the inner periphery of the nut member 14. The hollow portion 15*b* is provided to a range from the thread portion 15*a* to one side of the nut member 14 in the axial direction (a range on a side opposite to the motor 11 when the nut member 14 is attached to the screw member 12). The hollow portion 15*b* is formed in such a manner that a hollow space is disposed in a central part of the hollow portion 15*b* in a cross section perpendicular to the central axis of the nut member 14. The hollow portion 15*b* has a diameter or width larger than an outer diameter of the screw portion 13 so that the hollow portion 15*b* can move over the screw portion 13 without touching the screw portion 13.

The nut member 14 further includes a first fixing part 16 disposed in the other end in the axial direction. The first fixing part 16 is a male thread for fixing the internal cylinder cap 23, provided to the periphery of the nut member 14 in an opposite side of the driving unit with respect to the thread portion 15*a*. The first fixing part 16 is configured to be screwed with the internal cylinder cap 23 so as to fix the internal cylinder cap 23.

The nut member 14 is restrained from rotating in the peripheral direction with respect to the motor 11. When the screw member 12 rotates around an axis, driven by the motor 11, the nut member 14 is driven in the axial direction. A structure for preventing the rotation of the nut member 14 in the peripheral direction will be described later.

The spring 17 (corresponding to an example of an elastic member) is a coil-shaped spring configured to apply biasing force in the axial direction to the internal cylinder 20. When the internal cylinder 20 moves in a direction in which the internal cylinder 20 protrudes from the external cylinder 27, the spring 17 assists the movement of the internal cylinder 20 in this moving direction. The spring 17 is extensible/contractible along the axial direction of the internal cylinder 20 and constantly applies biasing force in an extending direction. One end of the spring 17 is brought into contact with the internal cylinder cap 23 (to be mentioned) and the other end thereof is brought into contact with the spring base 18 (to be mentioned).

The spring base 18 includes a base surface with which one end of the spring 17 is to be brought into contact and which receives one end of the spring 17. The spring base 18 is disposed in the external cylinder 27 in such a manner that one end thereof is faced the motor 11 and the other end is applied with pressure by the spring 17. Due to this pressure, the spring base 18 is pressed on the driving unit, which causes frictional force between the spring base 18 and driving unit. Accordingly, the rotation of the spring base 18 is prevented. The spring base 18 has a ring shape with a through-hole in the middle. The screw member 12 is to be inserted into this through-hole. The spring base 18 is provided with a projection 19 configured to be fitted with one of recessed parts 26 of the sleeve 24 (to be mentioned) and is configured to prevent the rotation of the sleeve 24. In the ring-shaped spring base 18, the projection 19 is provided to a partial range in the peripheral direction of the ring, protruded in the axial direction of the extensible/contractible driving device 6. The projection 19 is protruded, facing a side where the sleeve 24 is to be disposed. Note that either the spring base 18 or the sleeve 24 may be provided with a projection as long as both members are fitted with each other so as to prevent the rotation of the sleeve 24.

The internal cylinder cap 23 is configured to cover an opening in one end of the internal cylinder 20 and is configured to be fixed in the first fixing part 16 of the nut member 14 and the second fixing part 21 of the internal cylinder 20. A structure in which the internal cylinder cap 23 covers the opening in one end of the internal cylinder 20 corresponds to an example of a closing structure at a leading end of the internal cylinder 20. Note that the term closing structure does not indicate that the opening of the internal cylinder 20 is thoroughly shut, but it indicates that a part or the whole part of the opening of the internal cylinder 20 is closed. The closing structure includes a structure in which a part covering one end of the internal cylinder 20 includes a hole or a gap having a width smaller than the inner diameter of the internal cylinder 20.

A fixing part of the internal cylinder cap 23 is formed in a tubular shape, provided with a male thread in the periphery of its tubular body and a female thread in the inner periphery of the tubular body. The male thread in the periphery is configured to be screwed with the second fixing part 21 of the internal cylinder 20, and the female thread in the inner periphery is configured to be screwed with the first fixing part 16 of the nut member 14. The internal cylinder cap 23 is provided with an interval between the part where the first fixing part 16 is to be fixed and the part where the second fixing part 21 is to be fixed. The interval is a part in which the spring 17 between the nut member 14 and internal cylinder 20 passes and which prevents relative displacement between the nut member 14 and internal cylinder 20. As mentioned above, the internal cylinder 20 is controlled by the guiding part 25 of the sleeve 24 so as not to rotate in the peripheral direction. Since the internal cylinder cap 23 fixes the nut member 14, the nut member 14 is also controlled not to rotate in the peripheral direction with respect to the sleeve 24.

Furthermore, the internal cylinder cap 23 receives one end of the spring 17. In regard to the internal cylinder cap 23, one end of the spring 17 is brought into contact with a part between the internal cylinder 20 and nut member 14 so that the spring 17 can apply biasing force to the internal cylinder 20.

The internal cylinder cap 23 is a member to be exposed, performing as an end of the extensible/contractible driving device 6 in the extending/contracting direction. The leading end of the internal cylinder cap 23 may have a coupling structure for coupling one end of the extensible/contractible driving device 6 with other components.

The external cylinder cap 29 is connected to one end of the external cylinder 27 (the end in the side where the internal cylinder 20 is to be taken in and out) and is configured to seal a gap between the external cylinder 27 and internal cylinder 20. The external cylinder cap 29 has a tubular shape with a through-hole in the middle. The internal cylinder 20 is to be inserted into this through-hole so that the internal cylinder 20 slidably covers the end of the external cylinder 27. The external cylinder cap 29 is configured to prevent the sleeve 24 from jumping out of the external cylinder 27 and from rotating. Specifically, a stopper 30 protruding inward is provided to the inner periphery of the external cylinder cap 29. This stopper 30 protrudes inward from the inner periphery of the external cylinder 27 and is locked in one of the recessed parts 26 of the sleeve 24 so as to prevent the sleeve 24 from jumping out and from rotating.

Hereinafter described is the structure for preventing the rotation of the nut member 14. As mentioned above, the motor 11 and external cylinder cap 29 are fixed so as not to rotate with respect to the external cylinder 27. The spring base 18 is controlled so as not to rotate with respect to the motor 11 due to the biasing force of the spring 17. The sleeve 24 is locked in the spring base 18 and external cylinder cap 29, and is controlled so as not to rotate with respect to the external cylinder 27. Furthermore, the guiding part 25 of the sleeve 24 guides the guided part 22 of the internal cylinder 20 so that the internal cylinder 20 can be prevented from rotating with respect to the sleeve 24. The internal cylinder 20 and nut member 14 are fixed with each other through the internal cylinder cap 23 so that the nut member 14 is prevented from rotating with respect to the internal cylinder 20. Due to such a structure, the motor 11 and nut member 14 can be prevented from rotating in the peripheral direction with respect to the external cylinder 27 so that even when the motor 11 drives the screw member 12 to rotate, the nut member 14 can be prevented from rotating with respect to the motor 11. Accordingly, when the screw member 12 rotates, the nut member 14 moves in the axial direction.

Figure 4:
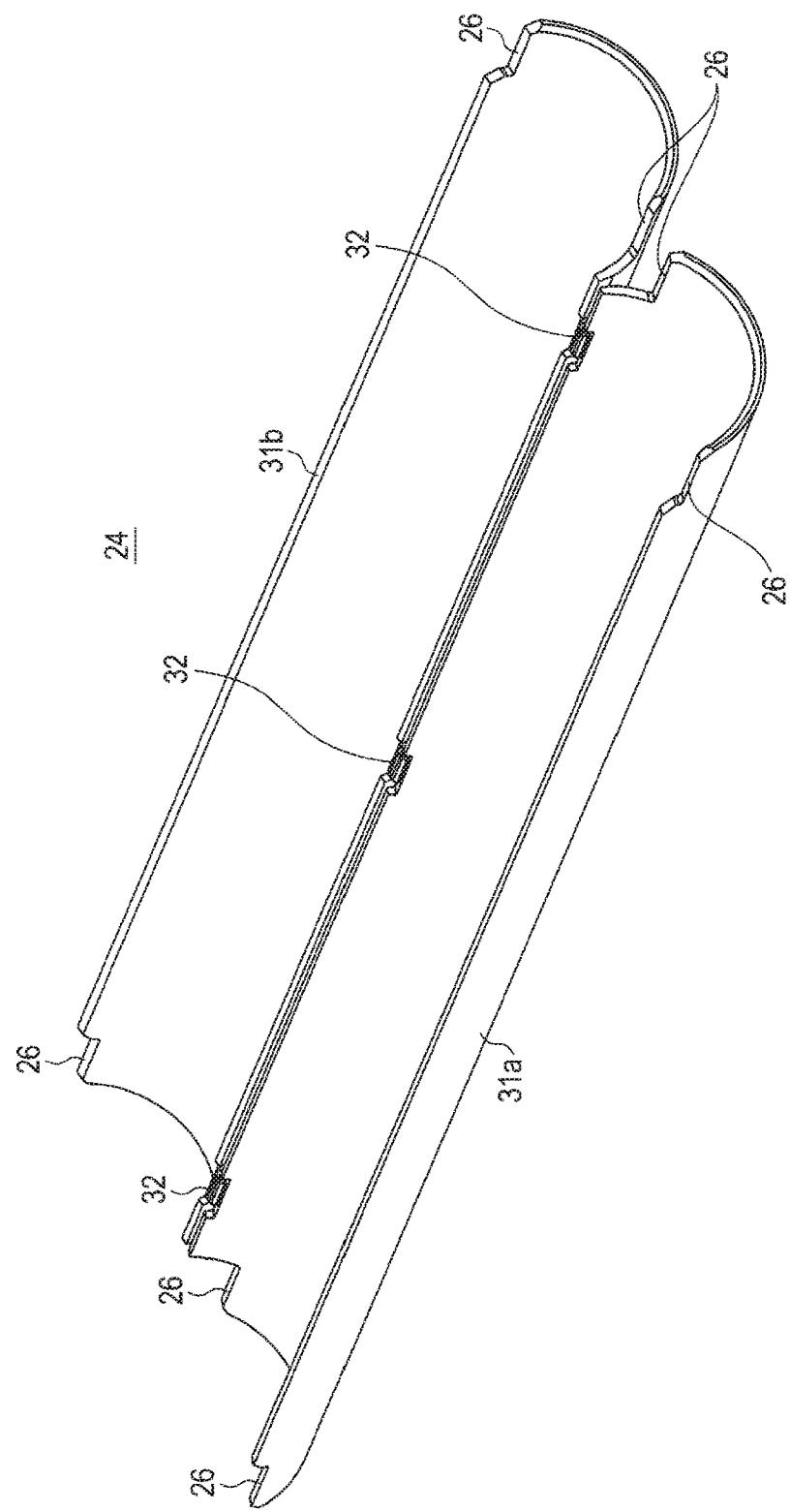
FIG. 4 is a perspective view illustrating a state where a sleeve illustrated in FIG. 3 is opened.
Figure 5:
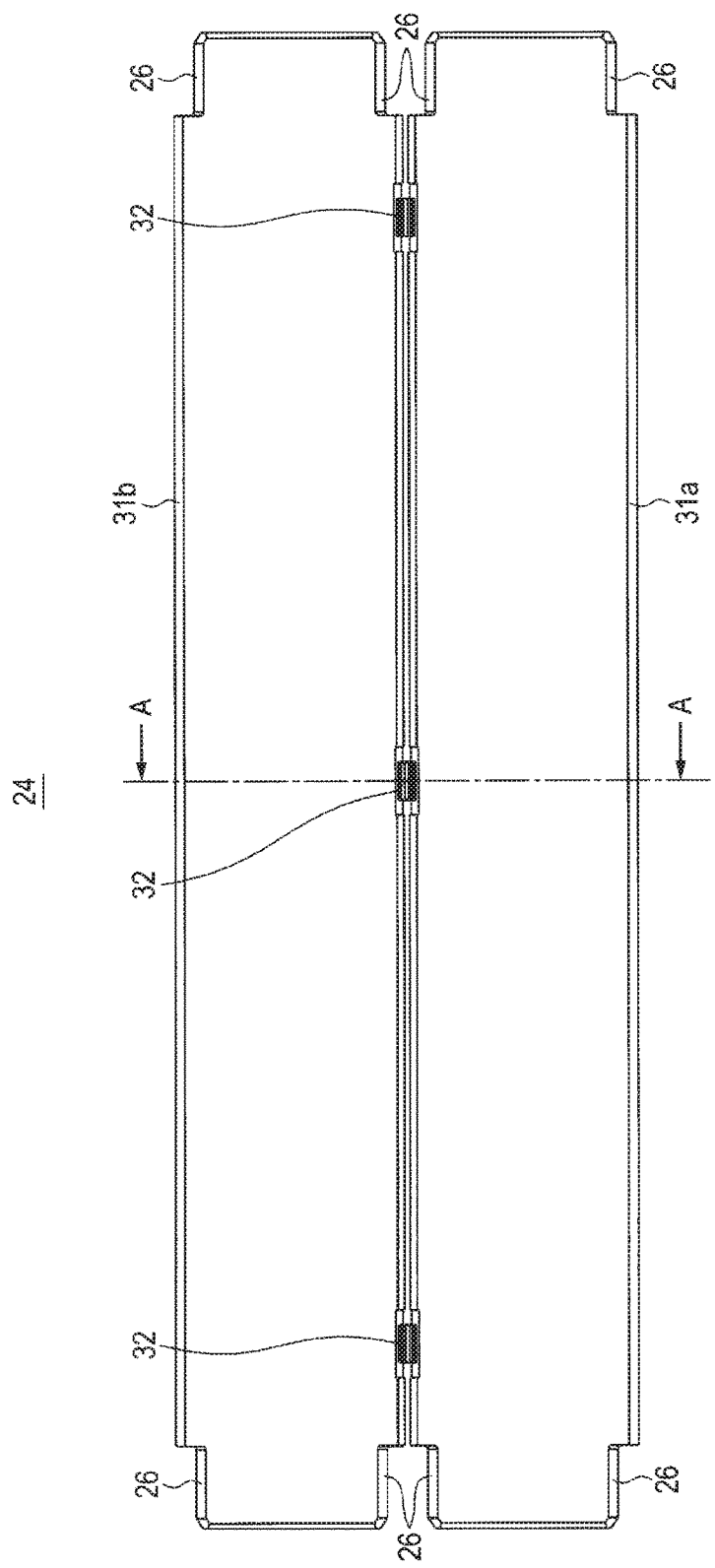
FIG. 5 is a plan view illustrating a state where the sleeve illustrated in FIG. 3 is opened.
Figure 6:
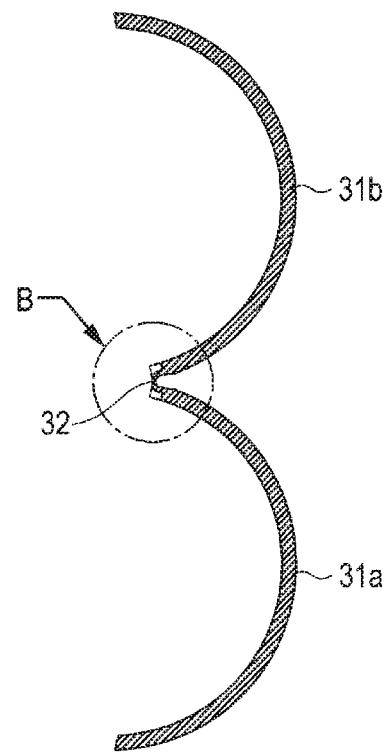
FIG. 6 is a cross sectional view taken along the line A-A in FIG. 5.
Figure 7:
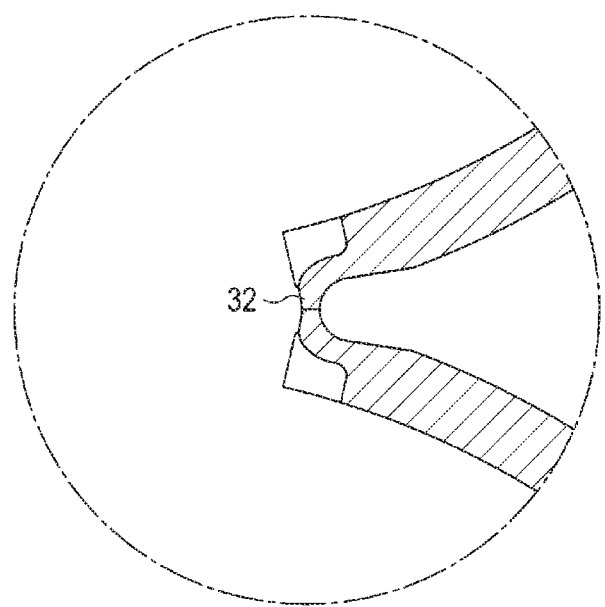
FIG. 7 is an enlarged view illustrating details of a part B illustrated in FIG. 6.

Next, the structures of the sleeve 24 will be described in more detail with reference to FIGS. 4 to 7 as well as FIGS. 2(*a*), 2(*b*), and 3. FIG. 4 is a perspective view illustrating a state where the sleeve 24 illustrated in FIG. 3 is opened widely. FIG. 5 is a plan view illustrating a state where the sleeve 24 illustrated in FIG. 3 is opened widely. FIG. 6 is a cross sectional view taken along the line A-A in FIG. 5. FIG. 7 is an enlarged view of a part B illustrated in FIG. 6.

The sleeve 24 (the intervening member) includes the guiding part 25, the recessed parts 26, sleeve members 31*a* and 31*b*, and hinge portions 32. With no external force, the sleeve 24 is in a state where the sleeve members 31*a*, 31*b* are opened with the hinge portions 32 disposed in the middle, as illustrated in FIGS. 4 to 6. When incorporated in the external cylinder 27, the sleeve 24 is shaped by the external force as illustrated in FIG. 3, corresponding to the inner periphery of the external cylinder 27. The guiding part 25 is a gap formed in such a manner that side edges of the sleeve members 31*a*, 31*b* are separated from each other.

The sleeve members 31*a*, 31*b* (corresponding to an example of component parts) is shaped in such a manner that a wall of the tubular body is partially divided by a dividing line extending in the axial direction. In regard to a plurality of sleeve members 31*a*, 31*b*, each member has a width designed in such a manner that a gap, which constitutes the guiding part 25, is formed between the plurality of sleeve members 31*a*, 31*b* when the plurality of sleeve members 31*a*, 31*b* are disposed in predetermined positions of the extensible/contractible driving device 6. Each of the sleeve members 31*a*, 31*b* has a length in a longitudinal direction of the external cylinder 27. Specifically, each of the sleeve members 31*a*, 31*b* has a length substantially corresponding to the length of the internal cylinder 20 in the axial direction. A pair of adjacent sleeve members 31*a* 31*b* is connected to each other by a plurality of hinge portions 32. One sleeve member 31a can be relatively moved with respect to the adjacent sleeve member 31b so that the sleeve 24 can be opened widely.

As mentioned above, the guiding part 25 guides the guided part 22 of the internal cylinder 20 in the axial direction (the extending/contracting direction of the extensible/contractible driving device 6). The guiding part 25 is a gap having a predetermined interval, provided between the two sleeve members 31a, 31b when the sleeve 24 is incorporated in the external cylinder 27.

The recessed parts 26 are configured to prevent the rotation of the sleeve 24 and are provided to one and the other end of the sleeve 24 in the axial direction (the extending/contracting direction of the extensible/contractible driving device 6). Each of the recessed parts 26 has a shape formed in such a manner that each end of the sleeve 24 in the axial direction is recessed toward the center in the axial direction. The recessed parts 26 may be provided to each of the sleeve members 31a, 31b. Alternatively, the recessed parts 26 may be provided to stride over the two sleeve members 31a, 31b as illustrated in FIGS. 4 and 5. As mentioned above, the recessed part 26 in one end is fitted with the projection 19 of the spring base 18, and the recessed part 26 in the other end is locked in the stopper 30 of the external cylinder cap 29. When the sleeve members 31a, 31b and the spring base 18 are engaged, the sleeve 24 is prevented from rotating with respect to the external cylinder 27.

The hinge portions 32 are configured to couple the sleeve members 31a, 31b and to impart biasing force in a direction in which the sleeve members 31a, 31b are opened. The hinge portions 32 and the plurality of sleeve members 31a, 31b are formed integrally. When the sleeve 24 is widely opened with no external force, the hinge portions 32 are shaped to have no undercut portion as illustrated in FIG. 7. In other words, the hinge portions 32 can be shaped by die forming. The plurality of sleeve members 31a, 31b are also shaped to have no undercut portion when the sleeve 24 is widely opened. The hinge portions 32 are provided to a plurality of positions in sides of the sleeve members 31a, 31b extending in the axial direction.

As mentioned above, the hinge portions 32 and sleeve members 31a, 31b can be shaped by the die forming so that the sleeve 24 can be easily formed with high dimensional precision using a die. Since the sleeve 24 can be formed evenly in the axial direction with high dimensional precision, it is possible to improve the slidability of the internal cylinder 20 and to suppress abnormal noise generated when sliding the internal cylinder 20, which is a problem caused by unevenness in shape of the sleeve 24. Furthermore, the sleeve 24 can be shaped evenly in the axial direction so that it is possible to prevent the sleeve 24 from interfering with other components during assembly of the extensible/contractible driving device 6.

The sleeve 24 is incorporated in the external cylinder 27 while the two sleeve members 31a, 31b are biased by the hinge portions 32 in the direction in which the sleeve members 31a, 31b are opened. In regard to the sleeve 24, the sleeve members 31a, 31b are displaced with each other so as to enlarge the width of the slit-like guiding part 25 inside the external cylinder 27, and outer surfaces of the sleeve members 31a, 31b are brought into contact with an inner wall inside the external cylinder 27. Therefore, the sleeve 24 can be maintained in a position where it does not interfere with the internal cylinder 20. Accordingly, it is possible to improve the slidability of the internal cylinder 20 and to suppress abnormal noise generated when sliding the internal cylinder 20, which is the problem caused by unevenness in shape of the sleeve 24. Furthermore, it is possible to prevent interference between the internal cylinder 20 and the sleeve 24 when the sleeve 24 moves closer to an actuation shaft of the extensible/contractible driving device 6 and when the internal cylinder 20 starts extension/contraction operation. Note that the sleeve 24 presses the inner surface of the external cylinder 27 as the width of the slit-like guiding part 25 is enlarged. However, in a case where a guiding part has a shape other than an opening, for example, a projection, and where a guided part is a slit, an opening part (for example, a slit similar to the guiding part 25) may be provided to the sleeve throughout the axial direction, configured to be opened widely by hinge portions, and the outer surface of the sleeve and the inner surface of the external cylinder may brought into contact with each other as the opening part opens widely.

Note that the hinge portions 32 may be bent after incorporation of the sleeve 24 in the extensible/contractible driving device 6. Even in such a case, the sleeve 24 is sandwiched between the internal cylinder 20 and external cylinder 27 and is capable of moving the internal cylinder 20 smoothly with respect to the external cylinder 27.

Next, operation of the extensible/contractible driving device 6 will be described. First, suppose that the extensible/contractible driving device 6 is in a state of contraction. When the motor 11 is supplied with power and the output shaft of the motor 11 is rotated, the screw member 12 receives rotative force from the motor 11 and rotates around a rotary shaft. The nut member 14 is prevented from rotating so that the nut member 14 moves straight along the axial direction by the rotation of the screw member 12. The nut member 14 is connected to the internal cylinder 20 through the internal cylinder cap 23 so that the internal cylinder 20 moves when the nut member 14 moves. Accordingly, the internal cylinder 20 moves from the external cylinder 27 and the extensible/contractible driving device 6 extends. When the extensible/contractible driving device 6 is connected to the back door 2, extension of the extensible/contractible driving device 6 opens the back door 2.

When the output shaft of the motor 11 is rotated in a reverse direction while the extensible/contractible driving device 6 is in a state of extension, the nut member 14 and internal cylinder 20 move straight in the reverse direction so that the extensible/contractible driving device 6 contracts. When the extensible/contractible driving device 6 is connected to the back door 2, contraction of the extensible/contractible driving device 6 close the back door 2.

As mentioned above, according to the extensible/contractible driving device 6 of the present embodiment, the sleeve 24 includes the plurality of sleeve members 31a, 31b; and the hinge portions 32 configured to impart biasing force in the direction in which the plurality of sleeve members 31a, 31b are opened. Accordingly, it is possible to prevent problems caused when the sleeve 24 is distorted such as generation of abnormal noise and interference with other components.

Furthermore, since the sleeve members 31a, 31b and hinge portions 32 can be shaped by the die forming, it is possible to produce the sleeve 24 with higher dimensional precision by forming the sleeve members 31a, 31b and hinge portions 32 in an integrated manner by the die forming.

Furthermore, according to the openable body opening/closing device 1 of the present embodiment, it is possible to prevent problems caused when the sleeve 24 of the extensible/contractible driving device 6 is distorted so that it is possible to reduce abnormal noise and the like of the extensible/contractible driving device 6 when opening/closing the extensible/contractible driving device 6. Still further, stable and smooth extension/contraction of the extensible/contractible driving device 6 can be achieved so that it is possible to open/close the back door 2 stably and smoothly.

Herein, the sleeve has been described that when it is incorporated in the external cylinder, the sleeve seen from a cross section is shaped to have the gap, performing as the guiding part, between the plurality of sleeve members. However, note that a guiding part may be provided to other members and a sleeve may not be provided with this gap. Herein, there are two sleeve members but there may be three or more of them.

Herein, the plurality of sleeve members and hinge portions have been described that they are formed integrally. However, each part may be formed as different components and may be connected to each other.

Furthermore, a back door of a vehicle has been described herein as an example of the openable body, but the openable body should not be restricted to an openable body in a vehicle. For example, the openable body herein is also applicable to one provided to a building or any equipment. Still further, the openable body herein should not be restricted to one provided to a rear part of a vehicle but may be one provided to a front part, side parts, or an upper part of a vehicle. Still further, the openable body should not be restricted to a door, but may be a window or a lid.

The present embodiment has been illustrated that the male and female threads are screwed with each other so as to fix the composing members in several fixing parts. However, composing members should not be restricted to be fixed with threads, and various fixing structures may be employable such as connection with latches, adhesion, and fastened fitting.

In addition, the present invention should not be restricted to the detailed structures, detailed shapes, and materials specifically illustrated in the embodiment and can be appropriately modified within the gist of the invention.

INDUSTRIAL APPLICABILITY

The present invention is applicable to an extensible/contractible driving device and openable body opening/closing device.

REFERENCE SIGNS LIST

1 OPENABLE BODY OPENING/CLOSING DEVICE
2 BACK DOOR
3 HINGE
4 FIRST STAY
5 SECOND STAY
6 EXTENSIBLE/CONTRACTIBLE DRIVING DEVICE
11 MOTOR
12 SCREW MEMBER
13 SCREW PORTION
14 NUT MEMBER
15a THREAD PORTION
16 FIRST FIXING PART
17 SPRING
18 SPRING BASE
19 PROJECTION
20 INTERNAL CYLINDER
21 SECOND FIXING PART
22 GUIDED PART
23 INTERNAL CYLINDER CAP
24 SLEEVE
25 GUIDING PART
26 RECESSED PART
27 EXTERNAL CYLINDER
28 MOTOR-FIXING PART
29 EXTERNAL CYLINDER CAP
30 STOPPER
31a, 31b SLEEVE MEMBERS
32 HINGE PORTION

The invention claimed is:

1. An extensible and contractible driving device, comprising:
    an external cylinder provided with a driving unit inside the external cylinder;
    an internal cylinder provided inside the external cylinder, having a closing structure at a leading end of the internal cylinder, and relatively moved in an axial direction with respect to the external cylinder;
    a rotatable driving member configured to be rotated by drive force of the driving unit;
    a drive force-transmitting member connected to the leading end of the internal cylinder, and configured to be driven by the rotatable driving member so as to move along a rotary shaft direction of the rotatable driving member; and
    an elastic member disposed in a periphery of the drive force-transmitting member, connected to the leading end of the internal cylinder, and configured to apply biasing force in the rotary shaft direction to the drive force-transmitting member:
    the rotatable driving member, the drive force-transmitting member, and the elastic member stored in an inner space of the external cylinder and the internal cylinder;
    the extensible and contractible driving device provided with an intervening member disposed in a periphery of the internal cylinder, and intervening between the internal cylinder and the external cylinder;
    the intervening member includes a plurality of component parts having a length in a longitudinal direction of the external cylinder; and
    one of the component parts is movable outward relatively to another component part so that an opening of the intervening member is enlarged.

2. The extensible and contractible driving device according to claim 1, wherein the plurality of component parts and hinge portions connecting the plurality of component parts are formed in an integrated manner in the intervening member.

3. The extensible and contractible driving device according to claim 1, wherein the intervening member has a shape with no undercut portion when the intervening member is opened.

4. The extensible and contractible driving device according to claim 1,
    wherein the internal cylinder includes a guided part configured to be guided extendably, the intervening member includes a guiding part configured to guide the guided part, and the guiding part is an opening which is provided throughout the axial direction and from which the intervening member is opened so that an outer surface of the intervening member is brought into contact with an inner surface of the external cylinder.

5. An openable body opening and closing device, comprising:
    the extensible and contractible driving device according to claim 1; and
    an opening and closing body connected to the extensible and contractible driving device, wherein the extensible and contractible driving device is driven to open and close the opening and closing body.

* * * * *